(12) United States Patent
Grant et al.

(10) Patent No.: US 11,800,939 B2
(45) Date of Patent: *Oct. 31, 2023

(54) MODULAR SHELF SWEEP DETECTOR

(71) Applicant: InVue Security Products Inc., Charlotte, NC (US)

(72) Inventors: Jeffrey A. Grant, Charlotte, NC (US); Gary A. Taylor, Fort Mill, SC (US); David N. Berglund, Indian Trail, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,840

(22) Filed: Jul. 11, 2022

(65) Prior Publication Data

US 2022/0338644 A1 Oct. 27, 2022

Related U.S. Application Data

(63) Continuation of application No. 17/175,253, filed on Feb. 12, 2021, now Pat. No. 11,412,863, which is a
(Continued)

(51) Int. Cl.
*A47F 3/00* (2006.01)
*A47F 1/12* (2006.01)
*G06Q 10/087* (2023.01)

(52) U.S. Cl.
CPC .............. *A47F 3/002* (2013.01); *A47F 1/126* (2013.01); *G06Q 10/087* (2013.01)

(58) Field of Classification Search
CPC ........ A47F 3/002; A47F 1/126; A47F 5/0018; A47F 1/04; A47F 1/125; G06Q 10/087;
(Continued)

(56) References Cited

U.S. PATENT DOCUMENTS

| 4,007,853 A | 2/1977 | Bahneman |
| 4,887,737 A | 12/1989 | Adenau |

(Continued)

FOREIGN PATENT DOCUMENTS

| WO | 01/76423 A2 | 10/2001 |
| WO | 02/091103 A2 | 11/2002 |

OTHER PUBLICATIONS

International Search Report and Written Opinion from corresponding International Application No. PCT/US2017/049393, dated Nov. 13, 2017 (8 pages).
(Continued)

*Primary Examiner* — Jennifer E. Novosad
(74) *Attorney, Agent, or Firm* — InVue Security Products Inc.

(57) ABSTRACT

Modular sweep detectors, systems, and methods for securing items of merchandise from theft and are provided. In one example, a modular sweep detector includes a housing configured to engage a pusher of a pusher device and a sensor configured to engage a biasing member of the pusher device. The biasing member is configured to be biased in response to movement of the pusher. The sensor is configured to detect movement of the pusher for determining if a predetermined number of items of merchandise have been removed from the pusher device.

21 Claims, 6 Drawing Sheets

Related U.S. Application Data continuation of application No. 16/328,091, filed as application No. PCT/US2017/049393 on Aug. 30, 2017, now abandoned.

(60) Provisional application No. 62/381,825, filed on Aug. 31, 2016.

(58) Field of Classification Search
CPC ........ G06Q 10/08; G06Q 99/00; G08B 13/14; G08B 13/1427; G08B 13/1436; G08B 13/1481; G08B 13/149; G06K 2017/0051
USPC ......... 211/59.3, 184, 74; 705/28; 340/539.1, 340/572.1, 568.8
See application file for complete search history.

(56) References Cited

U.S. PATENT DOCUMENTS

| | | |
|---|---|---|
| 6,269,285 B1 | 7/2001 | Mignault |
| 6,539,280 B1 | 3/2003 | Valiulis et al. |
| 7,150,365 B2 | 12/2006 | Hardy et al. |
| 7,299,934 B2 | 11/2007 | Hardy et al. |
| 7,389,886 B2 | 6/2008 | Hardy et al. |
| 7,451,881 B2 | 11/2008 | Hardy et al. |
| 7,497,341 B2 | 3/2009 | Hardy et al. |
| 7,584,016 B2 | 9/2009 | Weaver |
| 7,621,409 B2 | 11/2009 | Hardy et al. |
| 7,661,545 B2 | 2/2010 | Hardy et al. |
| 7,669,722 B2 | 3/2010 | Hardy et al. |
| 7,792,711 B2 | 9/2010 | Swafford, Jr. et al. |
| 8,047,385 B2 | 11/2011 | Hardy |
| 8,069,994 B2 | 12/2011 | Barkdoll |
| 8,113,601 B2 | 2/2012 | Hardy |
| 8,136,682 B2 | 3/2012 | Hardy |
| 8,210,363 B2 | 7/2012 | Hardy |
| 8,235,222 B2 | 8/2012 | Hardy |
| 8,235,227 B2 | 8/2012 | Hardy |
| 8,260,456 B2 | 9/2012 | Siegel et al. |
| 8,413,823 B2 | 4/2013 | Hardy |
| 8,443,988 B2 | 5/2013 | Niederhuefner |
| 8,662,320 B2 | 3/2014 | Csak |
| 8,676,377 B2 | 3/2014 | Siegel et al. |
| 8,812,378 B2 | 8/2014 | Swafford, Jr. et al. |
| 8,823,521 B2 | 9/2014 | Overhultz et al. |
| 8,933,789 B1 | 1/2015 | Fink et al. |
| 8,941,495 B2 | 1/2015 | Wiese et al. |
| 9,129,494 B2 | 9/2015 | Valiulis et al. |
| 9,265,358 B2 | 2/2016 | Hardy |
| 9,576,417 B2 | 2/2017 | Christianson et al. |
| 10,026,057 B1 | 7/2018 | Elsherif |
| 10,206,519 B1 | 2/2019 | Gyori et al. |
| 10,238,142 B1 | 3/2019 | Haddad |
| 10,405,674 B2 | 9/2019 | Mercier et al. |
| 10,588,427 B2 | 3/2020 | Mercier et al. |
| 11,412,863 B2 * | 8/2022 | Grant ...................... A47F 1/126 |
| 2001/0000019 A1 | 3/2001 | Bowers et al. |
| 2005/0040123 A1 | 2/2005 | Ali |
| 2005/0161420 A1 | 7/2005 | Hardy et al. |
| 2005/0168345 A1 | 8/2005 | Swafford, Jr. et al. |
| 2005/0269279 A1 | 12/2005 | Hardy et al. |
| 2005/0279722 A1 | 12/2005 | Ali |
| 2006/0097875 A1 | 5/2006 | Ott |
| 2007/0084812 A1 | 4/2007 | Hardy et al. |
| 2007/0193971 A1 | 8/2007 | Hardy et al. |
| 2007/0273513 A1 | 11/2007 | White |
| 2007/0275313 A1 | 11/2007 | Miyashita |
| 2008/0061015 A1 | 3/2008 | Hardy et al. |
| 2008/0135507 A1 | 6/2008 | Hardy et al. |
| 2009/0166304 A1 | 7/2009 | Hardy et al. |
| 2009/0248198 A1 | 10/2009 | Siegel et al. |
| 2009/0319399 A1 | 12/2009 | Resta et al. |
| 2009/0321373 A1 | 12/2009 | Hardy |
| 2010/0017025 A1 | 1/2010 | Lockwood et al. |
| 2011/0015781 A1 | 1/2011 | Vardaro |
| 2011/0055103 A1 | 3/2011 | Swafford, Jr. et al. |
| 2011/0068921 A1 | 3/2011 | Shafer |
| 2011/0094975 A1 | 4/2011 | Hardy |
| 2011/0210084 A1 | 9/2011 | Hardy |
| 2011/0218889 A1 | 9/2011 | Westberg et al. |
| 2011/0304316 A1 | 12/2011 | Hachmann et al. |
| 2011/0315706 A1 | 12/2011 | Lockwood et al. |
| 2012/0000869 A1 | 1/2012 | Hardy |
| 2012/0006772 A1 | 1/2012 | Hardy |
| 2012/0006774 A1 | 1/2012 | Hardy |
| 2012/0055892 A1 | 3/2012 | Hardy |
| 2012/0091162 A1 | 4/2012 | Overhultz et al. |
| 2012/0273442 A1 | 11/2012 | Hardy |
| 2012/0310570 A1 | 12/2012 | Pyne et al. |
| 2013/0002422 A1 | 1/2013 | Wiese et al. |
| 2013/0193096 A1 | 8/2013 | Hardy |
| 2013/0264917 A1 | 10/2013 | Baptiste et al. |
| 2013/0327730 A1 | 12/2013 | Hardy |
| 2014/0008382 A1 | 1/2014 | Christianson |
| 2014/0034592 A1 | 2/2014 | Hardy |
| 2014/0043162 A1 | 2/2014 | Siciliano et al. |
| 2014/0061218 A1 | 3/2014 | Volger et al. |
| 2014/0117818 A1 | 5/2014 | Dipaolo et al. |
| 2014/0167962 A1 | 6/2014 | Valiulis et al. |
| 2014/0175034 A1 | 6/2014 | Hardy |
| 2014/0299620 A1 | 10/2014 | Swafford, Jr. et al. |
| 2015/0083744 A1 | 3/2015 | Volger et al. |
| 2016/0132822 A1 | 5/2016 | Swafford |
| 2016/0132823 A1 | 5/2016 | Swafford et al. |
| 2016/0157635 A1 | 6/2016 | Hardy |
| 2016/0270559 A1 | 9/2016 | Dipaolo et al. |
| 2016/0316938 A1 | 11/2016 | Cruttenden et al. |
| 2017/0172315 A1 | 6/2017 | Hay |
| 2017/0202369 A1 | 7/2017 | Mercier et al. |
| 2017/0220987 A1 | 8/2017 | Sun et al. |
| 2017/0265652 A1 | 9/2017 | Obitts et al. |
| 2018/0020848 A1 | 1/2018 | Mercier et al. |
| 2018/0242756 A1 | 8/2018 | Aberg et al. |
| 2019/0019140 A1 | 1/2019 | Costello et al. |
| 2019/0164098 A1 | 5/2019 | Setchell et al. |
| 2019/0183259 A1 | 6/2019 | Grant et al. |
| 2019/0279149 A1 | 9/2019 | Swafford et al. |
| 2020/0060435 A1 | 2/2020 | Everett et al. |
| 2020/0163468 A1 | 5/2020 | Mercier et al. |
| 2022/0338644 A1 * | 10/2022 | Grant ...................... A47F 3/002 |

OTHER PUBLICATIONS

U.S. Appl. No. 60/497,437, filed Aug. 22, 2003.
"S3i ShelfNet—The Intelligent Way to Reduce Shrink, Increase On-Shelf Availability and Profitability", Alpha High Theft Solutions, Dec. 2015 (1 page).

* cited by examiner

MODULAR SHELF SWEEP DETECTOR

CROSS REFERENCE TO RELATED APPLICATIONS

This application is a continuation of U.S. patent application Ser. No. 17/175,253, filed on Feb. 12, 2021, which is a continuation of U.S. patent application Ser. No. 16/328,091, filed on Feb. 25, 2019, which is a 371 National Phase Entry of International Application No. PCT/US2017/049393, filed on Aug. 30, 2017, which claims the benefit of priority to U.S. Provisional Application No. 62/381,825 filed on Aug. 31, 2016, the entire disclosures of which are incorporated herein by reference.

BACKGROUND OF THE INVENTION

Embodiments of the present invention relate generally to merchandise security, including systems and methods for monitoring and protecting merchandise from theft in a retail environment.

Retailers display merchandise for consumers in a manner that allows consumers to decide whether to purchase the item while at the same time reducing the incidence of theft. Some merchandise is displayed in a manner that allows a consumer to take more than one product at a time for purchase. In some instances, removal of more than one item of merchandise at a time may be indicative of theft. Thus, retailers may benefit from techniques for detecting such theft while at the same time presenting the merchandise in a way that encourages a consumer to purchase the item. Retailers may further benefit from techniques for monitoring inventory of items of merchandise.

BRIEF SUMMARY

Embodiments of the present invention are directed towards modular sweep detectors, systems, and methods for securing items of merchandise from theft. In one example, a modular sweep detector includes a housing configured to engage a pusher of a pusher device and a sensor configured to engage a biasing member of the pusher device. The biasing member is configured to be biased in response to movement of the pusher. The sensor is configured to detect movement of the pusher for determining if a predetermined number of items of merchandise have been removed from the pusher device.

In one embodiment, a system for monitoring a pusher device in a retail environment is provided. The system includes a modular sweep detector comprising a housing configured to engage a pusher of the pusher device and a sensor configured to engage a biasing member of the pusher device. The biasing member is configured to be biased in response to movement of the pusher. The system also includes a monitoring device comprising an alarm for generating an alarm signal, wherein the monitoring device is configured to wirelessly communicate with the modular sweep detector. Moreover, the monitoring device is configured to determine if a predetermined number of items of merchandise have been removed from the pusher device based on a signal provided by the sensor. The monitoring device is configured to generate an alarm signal if a predetermined number of items of merchandise have been removed from the pusher device.

In another embodiment, a system for monitoring a pusher device in a retail environment is provided. The system includes a pusher device comprising a pusher and a biasing member. The system further includes a modular sweep detector comprising a housing configured to engage a pusher of the pusher device and a sensor configured to engage a biasing member of the pusher device. The biasing member is configured to be biased in response to movement of the pusher. The modular sweep detector also includes a monitoring device comprising an alarm for generating an alarm signal, wherein the monitoring device is configured to wirelessly communicate with the modular sweep detector. The monitoring device is configured to determine if a predetermined number of items of merchandise have been removed from the pusher device, and the monitoring device is configured to generate an alarm signal if a predetermined number of items of merchandise have been removed from the pusher device.

In one embodiment, a method for monitoring a pusher device in a retail environment is provided. The method includes wirelessly communicating with a modular sweep detector, the modular sweep detector configured to engage a pusher of the pusher device and a sensor configured to engage a biasing member of the pusher device. The method also includes determining if a predetermined number of items of merchandise have been removed from the pusher device based on a signal provided by the sensor. Moreover, the method includes generating an alarm signal if a predetermined number of items of merchandise have been removed from the pusher device.

In one embodiment, a modular sweep detector for monitoring a pusher device in a retail environment is provided. The modular sweep detector comprises a housing configured to be coupled to a pusher of the pusher device and a sensor configured to be coupled to a biasing member of the pusher device, the biasing member configured to be biased in response to movement of the pusher. The sensor is configured to detect movement of the pusher for determining if a predetermined number of items of merchandise have been removed from the pusher device.

DETAILED DESCRIPTION OF EMBODIMENTS OF THE INVENTION

Figure 1:
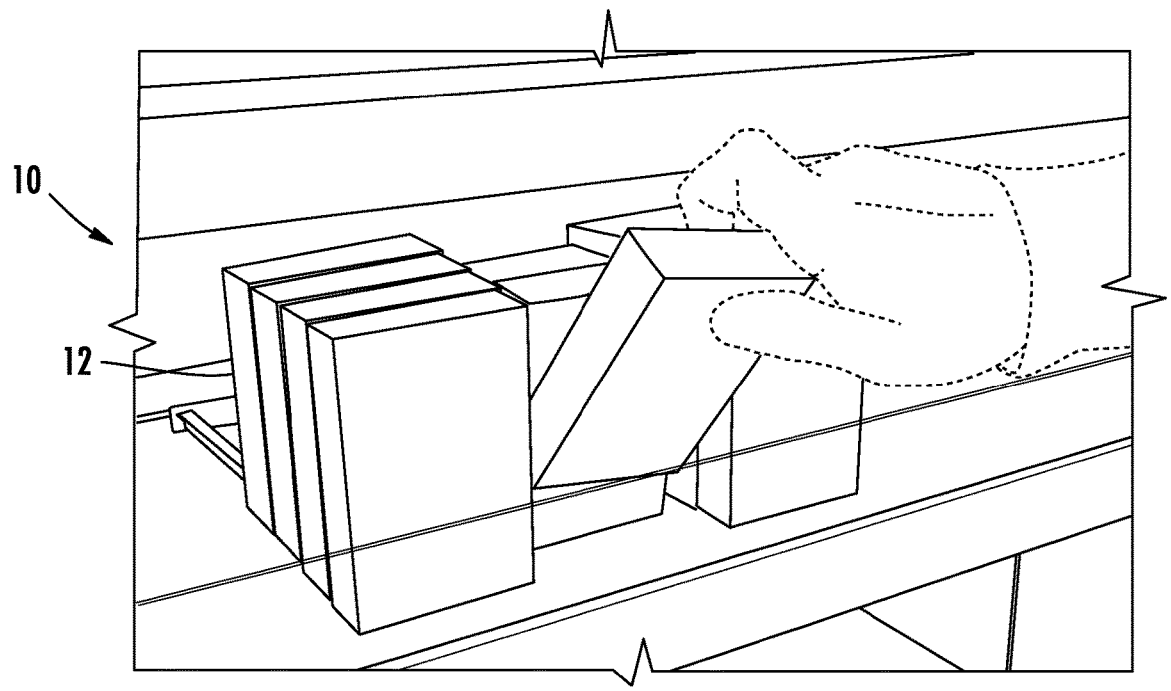
FIG. 1 illustrates a system for securing items of merchandise from theft and/or monitoring items of merchandise according to one embodiment of the present invention.

Referring to the accompanying figures wherein identical reference numerals denote the same elements throughout the various views, the illustrated embodiments of methods and systems according to the present invention are capable of not only protecting an item of merchandise against theft or unauthorized removal, but also for monitoring merchandise in a retail environment. The item of merchandise 12 may be any item, including any number of consumer products. The items of merchandise 12 may be packaged (or boxed) or non-packaged items. The system, indicated generally at 10, is operable for securing items of merchandise 12 from theft and/or monitoring items of merchandise (see, e.g., FIG. 1). Although described in relation for use in a retail environment, the system 10 shown and described herein is suitable for monitoring and securing an item of merchandise 12 in other settings, such as for example, a residential or commercial environment, and is not intended to be limited to use only as a system for protecting against theft and/or unauthorized removal in a retail environment.

Figure 2:
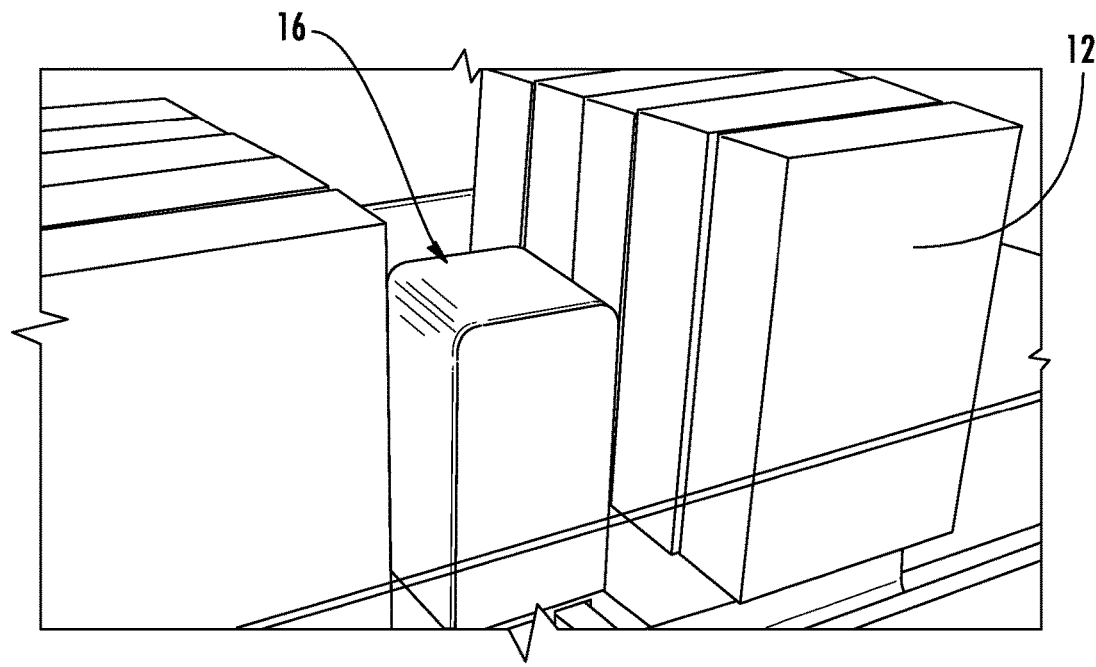
FIG. 2 illustrates a modular sweep detector according to one embodiment of the present invention.
Figure 3:
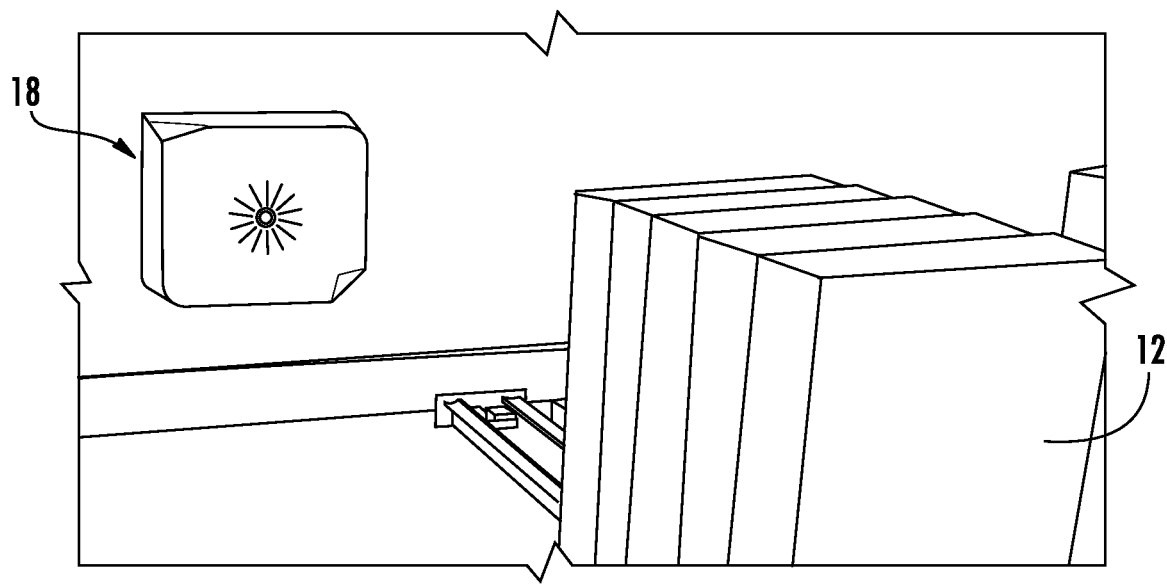
FIG. 3 illustrates a monitoring device according to one embodiment of the present invention.
Figure 4:
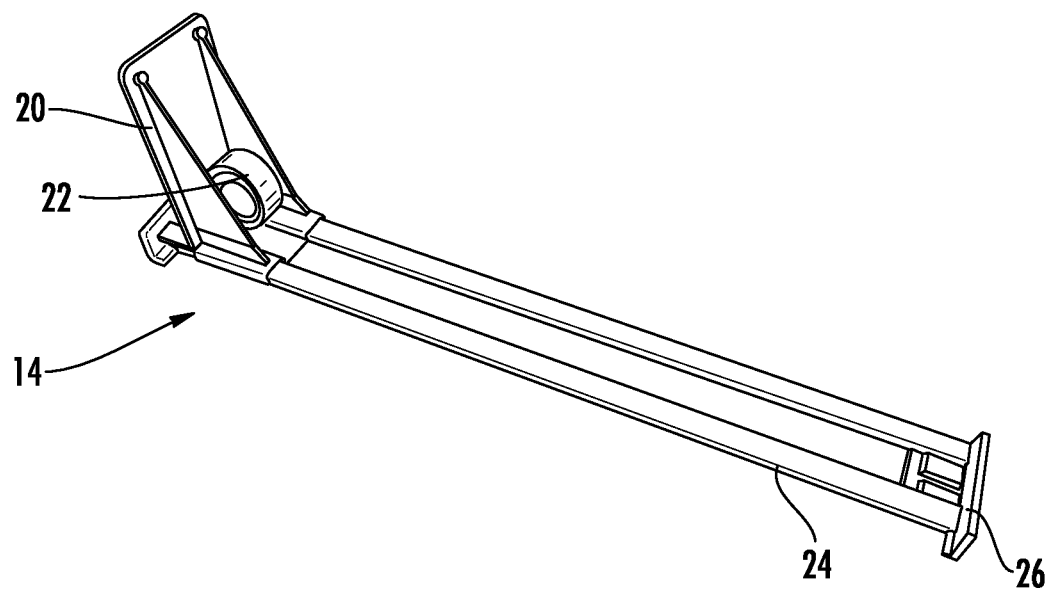
FIG. 4 illustrates a pusher device according to one embodiment of the present invention.
Figure 5:
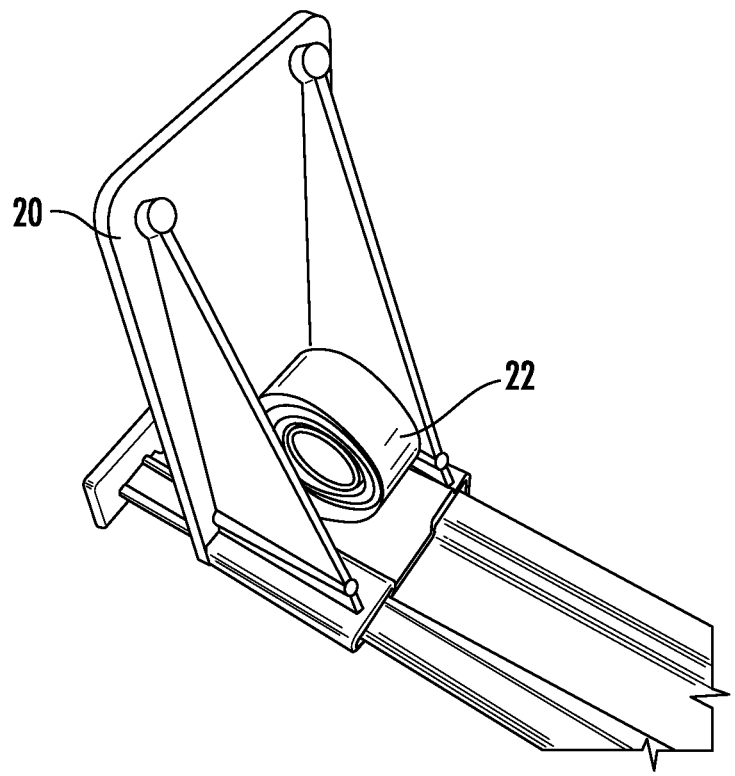
FIG. 5 is an enlarged view of a pusher and a biasing member shown in FIG. 4.
Figure 6:
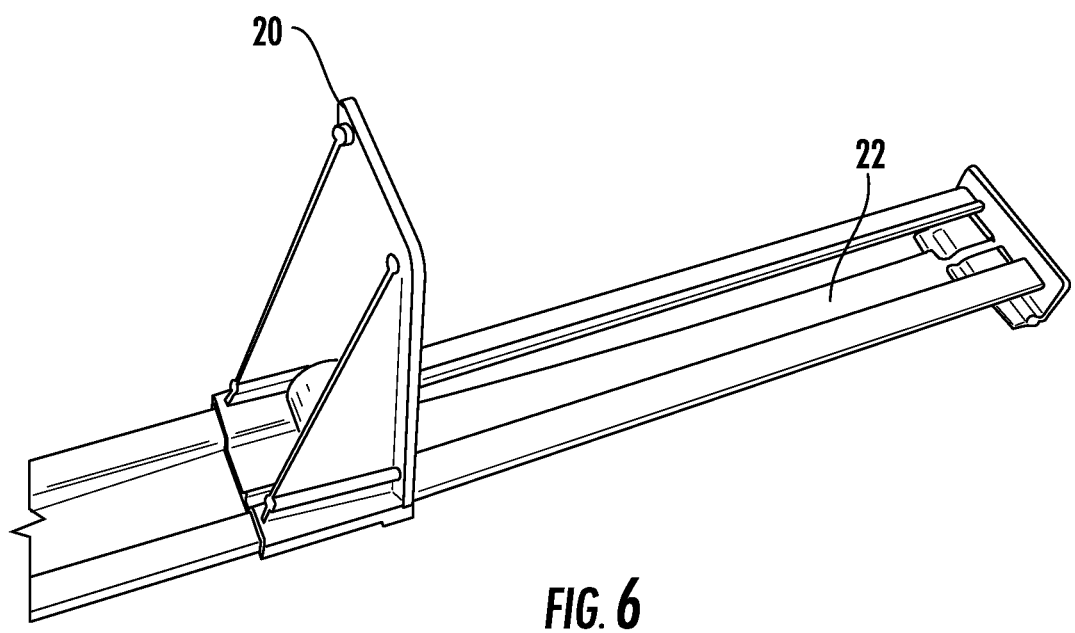
FIG. 6 illustrates the biasing member shown in FIG. 5 in a partially unwound position.
Figure 7:
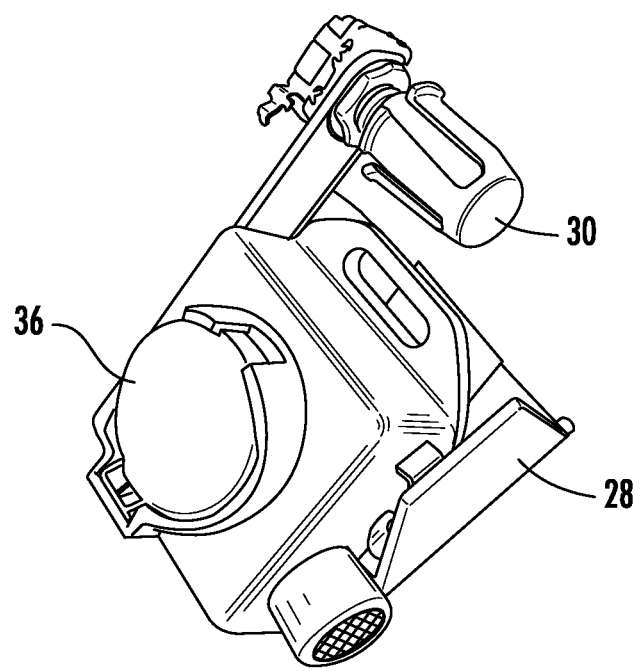
FIG. 7 illustrates a modular sweep detector having a sensor according to one embodiment of the present invention.
Figure 8:
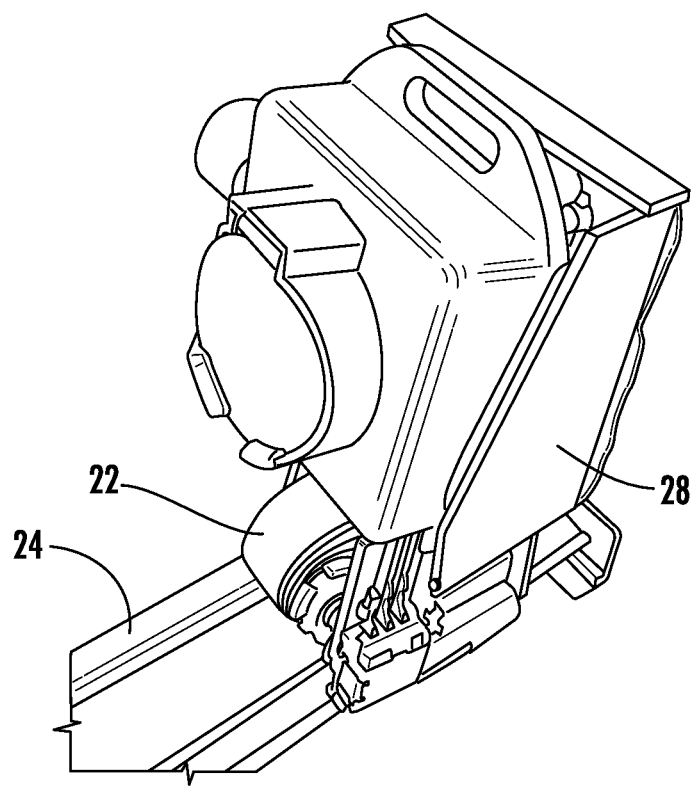
FIG. 8 illustrates the housing of the modular sweep detector shown in FIG. 7 coupled to the pusher device shown in FIG. 4.
Figure 9:
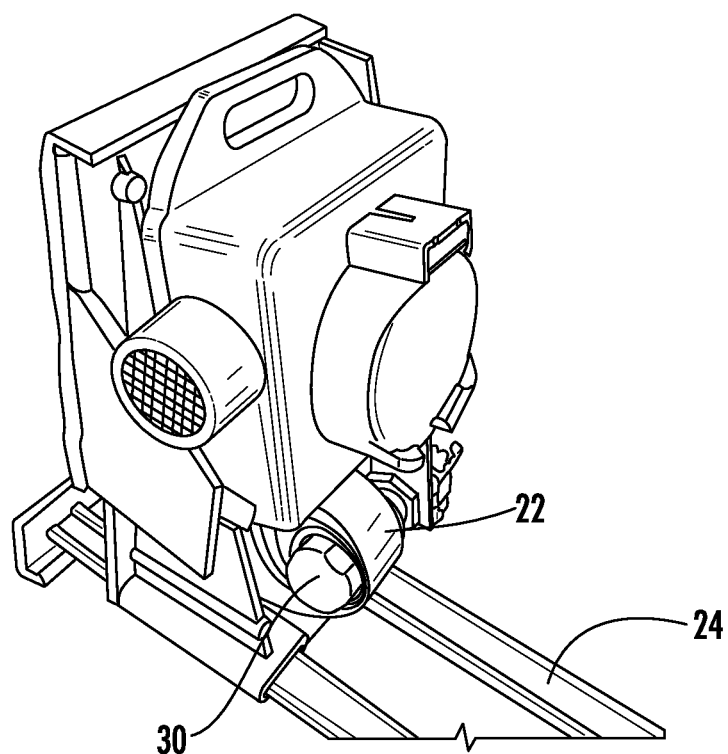
FIG. 9 illustrates the sensor shown in FIG. 7 coupled to the pusher device shown in FIG. 4.
Figure 10:
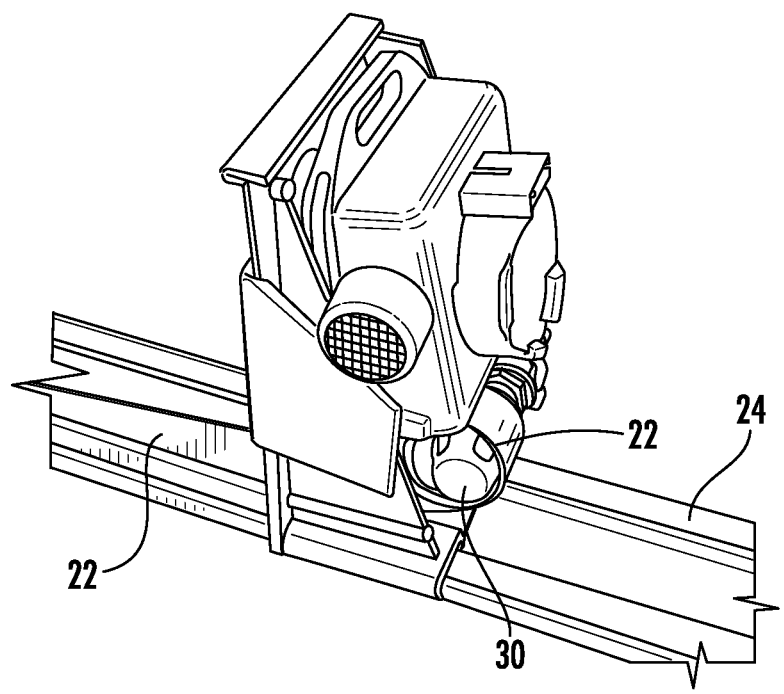
FIG. 10 illustrates the sensor shown in FIG. 7 with a biasing member shown in FIG. 4 in a partially unwound position.
Figure 11:
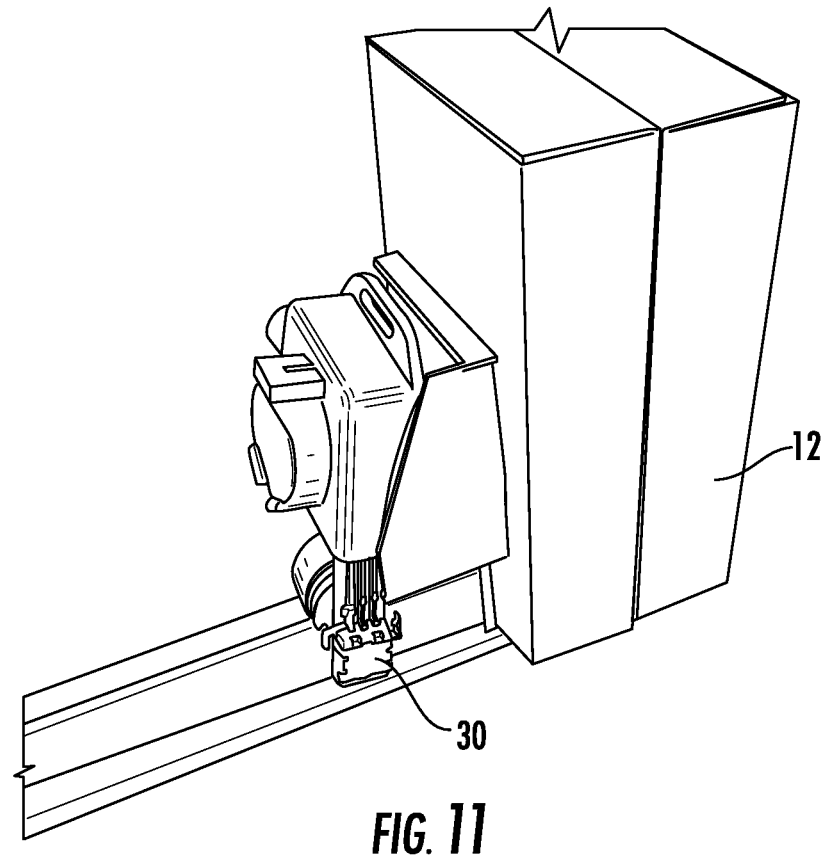
FIG. 11 illustrates the sensor shown in FIG. 7 coupled to the pusher device shown in FIG. 4 abutting items of merchandise.

According to one embodiment, the system 10 generally comprises a pusher device 14 (see, e.g., FIG. 4), a modular sweep detector 16 (see, e.g., FIG. 2), and a monitoring device 18 (see, e.g., FIG. 3). In some embodiments, the pusher device 14 is a conventional or off-the-shelf device, and the modular sweep detector 18 is configured to be adapted to the pusher device. Generally, the pusher device 14 includes a pusher 20 and a biasing member 22 whereby the pusher is configured to bias the pusher towards a particular position. The pusher device 14 may further include a rail member 24 and a stop member 26 in some applications. The pusher 20 is configured to abut one or more items of merchandise and move along the rail member 24, while the biasing member 22 is configured to bias the pusher towards the stop member 26 at an end of the rail member. The items of merchandise may thus be disposed between the pusher 20 and the stop member 26 in a relaxed state. As items of merchandise are removed, the pusher 20 is biased towards the stop member 26. The pusher device 14 may be located on a shelf in a retail environment, and the pusher 20 may be configured to move the items of merchandise under the force of the biasing member 22 for presenting the items of merchandise to consumers. For example, the biasing member 22 may be a clock spring, power spring, flat spiral spring, or the like. Thus, as merchandise is added to the pusher device 14, the clock spring is configured to unwind (see, e.g., FIG. 6), and as merchandise is removed to the pusher device, the clock spring is configured to wind (see, e.g., FIG. 5). It is understood that the modular sweep detector 16 may be configured for use with a variety of types of pusher devices, such as the pusher device described above. For instance, pusher devices may be utilized on shelves, display hooks, and the like for presenting merchandise to a consumer. In the case of a display hook, the pusher 20 may be configured to move along a rod under the bias of biasing member 22, and the end of the rod may include a bend or like stop member.

Advantageously, the modular sweep detector 16 is configured to be removably attached to the pusher device 14 in a manner that does not hinder the operation of the pusher device. In one example, the modular sweep detector 16 comprises a housing 28 that is configured to engage the pusher 20. For example, the housing 28 may be snap fitted to the pusher and/or secured with a fastener (e.g., an adhesive). The housing 28 may be configured to enclose the pusher 14. When attached to the pusher, the modular sweep detector 16 is configured to move with the pusher 20. The modular sweep detector 16 may include a sensor 30. The sensor 30 may be enclosed within the housing 28. The sensor 30 may be configured to detect movement of the pusher 20. In some instances, the sensor 30 may be configured to contact and directly engage the biasing member 22. Thus, as the biasing member 22 moves, the sensor 30 may likewise be configured to move and detect such movement. In one embodiment, the sensor 30 is a rotary encoder and is configured to rotate as the coil spring is wound and unwound (see, e.g., FIGS. 7-11). The sensor 30 may be configured to generate a signal in response to movement of the pusher 20 (e.g., an audible tone or visual indicator). For example, movement in one direction may generate a first signal while movement in an opposite direction may generate a second signal. These signals may be indicative of removing or loading the items of merchandise.

Figure 12:
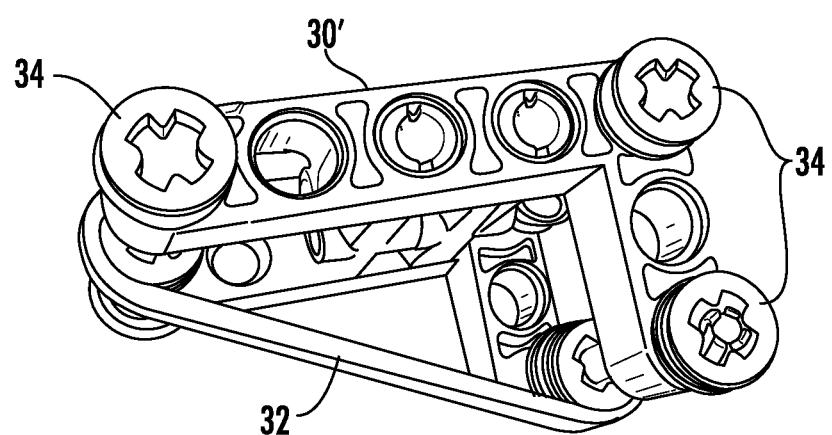
FIG. 12 illustrates a sensor according to another embodiment of the present invention.

It is understood that other types of sensors 30 may be employed. For example, FIG. 12 shows a sensor 30' including a resilient member 32. The resilient member 32 may be configured to engage the biasing member 22 and move as the pusher 20 moves for generating one or more signals. The resilient member 32 may be configured to at least partially conform to an outer surface of the biasing member 22. For instance, the resilient member 32 may be configured to engage with and conform to a portion of an outer surface of the biasing member 22. Where a clock spring is utilized, the resilient member 32 may be configured to conform to the curvature of the clock spring. The resilient member 32 may be formed of a material (e.g., a rubber or elastomeric material) that facilitates friction with the biasing member 22 to maintain contact therebetween in response to movement of the pusher 20. The sensor 30' may include a series of rotatable pulleys 34 whereby rotation of one or more of the pulleys may be used to provide a signal as discussed above. As such, the resilient member 32 may be a closed loop in some cases and be configured to rotate each of the rotatable pulleys 34 in response to movement of the resilient member.

The modular sweep detector 16 and monitoring device 18 may include wireless communications circuitry for communicating with one another using any desired communications protocol (e.g., Bluetooth, Wi-Fi, radiofrequency, etc.). The modular sweep detector 16 and monitoring device 18 may be located remotely from one another. For example, the monitoring device 18 may be located at some fixed location in proximity to one or more modular sweep detectors 16. In some embodiments, the signal(s) generated by the sensor 30, 30' may be configured to be transmitted to the monitoring device 18. These signals may be processed by the monitoring device 18 for determining whether a predetermined number of items of merchandise have been added or removed. For example, the signals may be used to determine a thickness of each item of merchandise when loading the items of merchandise on the pusher device 14. Thus, in a way, the monitoring device 18 may "learn" the thickness of the items of merchandise when loaded on the pusher device 14. As the sensor 30, 30' moves forwards and/or backwards as items of merchandise are loaded, the sensor is configured to generate one or more signals that can be used to determine a thickness of the item of merchandise. The signals generated by the sensor 30, 30' may be indicative of linear distance or full/partial rotation of the sensor. Once the items of merchandise are loaded on the pusher device 14, removal of a predetermined number of items may be indicative of a theft or "sweep". For instance, removal of a plurality of items of merchandise may be indicative of theft or sweep, while removal of one item of merchandise is not indicative of theft or sweep. The predetermined number of items of merchandise that is indicative of theft may be input by authorized personnel at the monitoring device 18 or may be preset by the manufacturer. The modular sweep detector 16 and/or the monitoring device 18 may have an alarm that is configured to generate an alarm signal (e.g., an audible and/or visible signal) as a result of such removal. The modular sweep detector 16 and/or the monitoring device 18 may have a power source 36 for providing power for operating the wireless communications circuitry, as well as any other components requiring power. Furthermore, it is understood that the modular sweep detector 16 and monitoring device 18 may communicate via wired means if desired.

In some embodiments, a monitoring device 18 may be configured to be paired with one or more modular sweep detectors 16. For example, a plurality of modular sweep detectors 16 may be paired with one monitoring device 18. Thus, the monitoring device 18 may be configured to monitor a plurality of signals provided by the modular sweep detectors 16 and to determine if a theft event has occurred. In some instances, each modular sweep detector 16 may be wirelessly paired to a monitoring device 18, such as, for example, via Bluetooth communication. Pairing may include the exchange of a particular code or identifier that associates a modular sweep detector 16 with a monitoring device 18. An authorized user may initiate communication between a modular sweep detector 16 and a monitoring device 18 for pairing or unpairing with one another, such as by pressing an actuator on the modular sweep detector and/or the monitoring device. Therefore, any number of modular sweep detectors 16 may be added to or removed from the system 10, and likewise a plurality of monitoring devices 18 may be employed.

In another embodiment, the system 10 may be utilized for inventory control. For instance, the monitoring device 18 may be configured to monitor a number of items of merchandise on a pusher device 14 based on input from the sensor 30, 30' and alert authorized personnel should the inventory fall below a predetermined number. The monitoring device 18 may further be configured to facilitate communication with one or more remote devices for providing notification regarding inventory levels. Such communication could occur, for instance, over a cloud network. In other embodiments, the modular sweep detector 16 and/or the monitoring device 18 may be configured to generate an alarm signal should the inventory fall below a predetermined level.

The foregoing has described one or more embodiments of systems and methods for securing item of merchandises from theft or unauthorized removal. Although embodiments of the present invention have been shown and described, it will be apparent to those skilled in the art that various modifications thereto can be made without departing from the spirit and scope of the invention. Accordingly, the foregoing description is provided for the purpose of illustration only, and not for the purpose of limitation.

That which is claimed is:

1. A system for monitoring items of merchandise in a retail environment, the system comprising:
a display device for displaying items of merchandise;
a modular detector comprising a housing and a sensor, the sensor configured to generate a signal indicative of a number of items of merchandise displayed by the display device; and
a monitoring device configured to wirelessly communicate with the modular detector,
wherein the modular detector is configured to be paired with the monitoring device based on a wireless exchange of a code or identifier for associating the modular detector with the monitoring device, and
wherein the monitoring device is configured to determine if a predetermined number of items of merchandise have been removed from the display device based on the signal provided by the sensor.

2. The system of claim 1, wherein the display device is a pusher device comprising a pusher for abutting the items of merchandise.

3. The system of claim 1, wherein the display device is a display hook.

4. The system of claim 1, wherein the sensor is configured to engage the display device.

5. The system of claim 1, wherein the sensor is configured to detect movement of the display device for determining if a predetermined number of items of merchandise have been removed from the display device.

6. The system of claim 1, wherein the monitoring device comprises an alarm for generating an alarm signal, and wherein the monitoring device is configured to generate an alarm signal if a predetermined number of items of merchandise have been removed from the display device.

7. The system of claim 1, wherein the housing is configured to be snap-fit to the display device.

8. The system of claim 1, further comprising wireless communications circuitry contained within the housing.

9. The modular detector of claim 8, further comprising a power source for providing power for operating the wireless communications circuitry.

10. The system of claim 1, wherein the monitoring device is configured to determine a thickness of each item of merchandise based on the signal provided by the sensor.

11. The system of claim 1, further comprising a plurality of modular detectors, wherein the monitoring device is configured to communicate with each of the plurality of modular detectors.

12. The system of claim 1, wherein the modular detector is configured to be paired with the monitoring device based on Bluetooth communication.

13. The system of claim 1, wherein the monitoring device is configured to facilitate communication with one or more remote devices for providing notification regarding an inventory of the items of merchandise.

14. The system of claim 1, wherein the monitoring device is located remotely from the modular detector.

15. The system of claim 1, wherein the modular detector is configured to be paired with the monitoring device based on a wireless exchange of a code for associating the modular detector with the monitoring device.

16. The system of claim 1, wherein the modular detector is configured to be paired with the monitoring device based on a wireless exchange of an identifier for associating the modular detector with the monitoring device.

17. The system of claim 1, wherein the modular detector is configured to be removably attached to the display device.

18. A method for monitoring items of merchandise in a retail environment, the method comprising:
wirelessly communicating with a modular detector, the modular detector comprising a sensor;

pairing the modular detector with a monitoring device based on a wireless exchange of a code or identifier for associating the modular detector with the monitoring device;

generating a signal with the sensor indicative of a number of items of merchandise displayed by the display device; and determining if a predetermined number of items of merchandise have been removed from the display device based on the signal provided by the sensor.

19. The method of claim 18, further comprising generating an alarm signal if a predetermined number of items of merchandise have been removed from the display device.

20. The method of claim 18, further comprising determining a thickness of each item of merchandise based on the signal provided by the sensor.

21. The method of claim 18, further comprising wirelessly communicating with a plurality of modular detectors.

\* \* \* \* \*